(12) United States Patent
Burk et al.

(10) Patent No.: US 12,026,102 B2
(45) Date of Patent: Jul. 2, 2024

(54) ISOLATING FUNCTIONS IN A MEMORY DEVICE

(71) Applicant: Micron Technology, Inc., Boise, ID (US)

(72) Inventors: Michael Burk, Orangevale, CA (US); Lance Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 128 days.

(21) Appl. No.: 17/939,672

(22) Filed: Sep. 7, 2022

(65) Prior Publication Data

US 2024/0078192 A1   Mar. 7, 2024

(51) Int. Cl.
G06F 12/14   (2006.01)

(52) U.S. Cl.
CPC ...... G06F 12/1458 (2013.01); G06F 12/1408 (2013.01); G06F 12/1441 (2013.01)

(58) Field of Classification Search
CPC ............ G06F 12/1408; G06F 12/1411; G06F 12/1458

See application file for complete search history.

(56) References Cited

U.S. PATENT DOCUMENTS

| 2015/0227471 A1* | 8/2015 | Stafford | G06F 12/1441 711/164 |
| 2017/0286325 A1* | 10/2017 | Singh | G06F 13/4282 |
| 2022/0327228 A1* | 10/2022 | Jeon | G06F 21/6218 |

OTHER PUBLICATIONS

"TCG Storage Security Subsystem Class: Opal", Trusted Computing Group, https://trustedcomputinggroup.org/wp-content/uploads/TCG_Storage-Opal_SSC_v2.01_rev1.00.pdf, Jan. 24, 2022, 92 pages.

* cited by examiner

*Primary Examiner* — Aracelis Ruiz

(74) *Attorney, Agent, or Firm* — Brooks, Cameron & Huebsch, PLLC

(57) ABSTRACT

Systems, apparatuses, and methods related to isolating virtual machines in a memory device are described. A memory apparatus includes a memory device and a controller coupled to the memory device, wherein the controller is configured to provide a plurality of Peripheral Component Interconnect express (PCIe) functions of the memory device and isolate access to each of the plurality of PCIe functions via respective passwords and digital signatures created from host keys.

20 Claims, 5 Drawing Sheets

ISOLATING FUNCTIONS IN A MEMORY DEVICE

TECHNICAL FIELD

The present disclosure relates generally to semiconductor memory and methods, and more particularly, to apparatuses, systems, and methods for isolating functions in a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
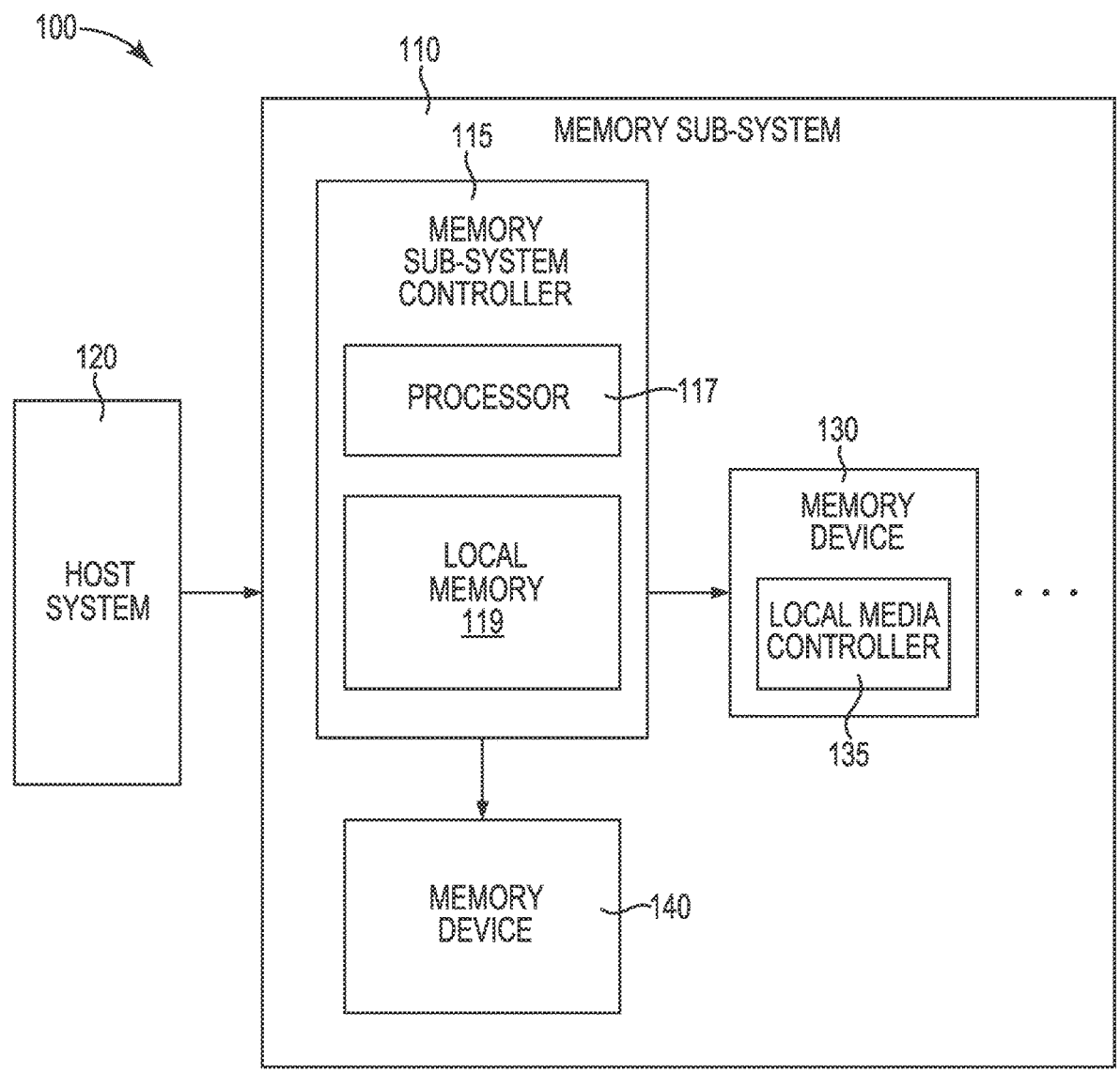
FIG. 1 is an example computing system that includes a memory sub-system in accordance with some embodiments of the present disclosure.

Aspects of the present disclosure are directed to isolating access to each of a plurality of Peripheral Component Interconnect Express (PCIe) functions of a memory device. An embodiment includes a memory apparatus comprising a memory device and a controller coupled to the memory device, wherein the controller is configured to provide a plurality of PCIe functions of the memory device and isolate access to each of the plurality of PCIe functions via respective passwords and digital signatures created by host keys.

The memory device may be a non-volatile memory device, such as not-and (NAND) type flash memory. NAND type flash memory includes, for example, two-dimensional NAND (2D NAND) and three-dimensional NAND (3D NAND). Non-volatile memory devices can include one or more arrays of memory cells. The memory cells can be operated as single level cells (SLC) to store one bit per cell. The memory cells can be operated as multi-level cells (MLCs) to store two bits per cell, triple level cells (TLCs) to store three bits per cell, quad-level cells (QLCs) to store four bits per cell, and penta-level cells (PLCs) to store five bits per cell, among other examples including storing fractional bits per cell.

PCIe functions can be physical functions. In general, a PCIe physical function can provide single-root input/output virtualization (SR-MY) capability and can manage the SR-IOV functionality. Physical functions are fully featured PCIe functions that can be discovered, managed, and manipulated like any other PCIe device. In addition, physical functions can be used to configure and control a PCIe device. Embodiments are not so limited, however, and in some embodiments, the PCIe function can be virtual functions. In general, virtual functions are PCIe functions that are associated with a physical function. For example, a virtual function can be a lightweight PCIe function that shares one or more physical resources with the physical functions and/or with virtual functions that are associated with that physical function. Unlike a physical function, a virtual function can generally only configure its own behavior.

Multiple virtual functions can be coupled to a PCIe switch. In previous approaches, any device that could access that PCIe switch could also access more than one, or all, virtual functions coupled to the switch. This approach could lead to a user having access to certain virtual functions to which the user was not intended to have access. This could also lead to PCIe functions being able to infiltrate other PCIe functions.

Aspects of the present disclosure address the above and other deficiencies by isolating the different virtual functions that share physical resources with a physical function. The virtual functions can be isolated such that only an intended device can access each respective virtual function. This is accomplished through requiring a digital signature and/or password to access each virtual function. Requiring a digital signature and/or a password to access each virtual function that shares physical resources with a physical function can increase the security of a memory system by only allowing certain devices to access certain virtual functions.

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. Analogous elements within a figure may be referenced with a hyphen and extra numeral or letter. Such analogous elements may be generally referenced without the hyphen and extra numeral or letter. For example, elements 206-1, 206-2, . . . , 206-N in FIG. 2 may be collectively referenced as 206. As used herein, the designator "N," particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example computing system 100 that includes a memory sub-system 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, the term "coupled to" or "coupled with" can refer to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 can use the memory sub-system 110, for example, to write data to the memory sub-system 110 and read data from the memory sub-system 110.

The host system 120 can be coupled to the memory sub-system 110 via an interface (e.g., a physical host interface). Examples of an interface can include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), Universal Serial Bus (USB), or any other interface. The interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The interface can provide a way for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM), synchronous dynamic random access memory (SDRAM), and resistive DRAM (RDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type memory (e.g., 2D NAND, 3D NAND) are described, the memory device 130 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g. processor 117), configured to execute instructions stored in a local memory 119. In the illustrated example, the local memory 119 of the memory sub-system controller 115 can include an embedded memory configured to store instructions for performing various processes, operations, logic flows, and routines that control operation of the memory sub-system 110, including handling communications between the memory sub-system 110 and the host system 120.

In some embodiments, the processor 117 can provide a plurality of PCIe functions of the memory device and isolate access to each of the plurality of PCIe functions via respective passwords and digital signatures, wherein the digital signatures are created from respective host keys assigned to each PCIe function. For example, the PCIe functions can be isolated by requiring a corresponding password and/or digital signature to access address ranges corresponding to each PCIe function.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface (not pictured) circuitry to communicate with the host system 120 via a physical host interface (not pictured). The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

Figure 2:
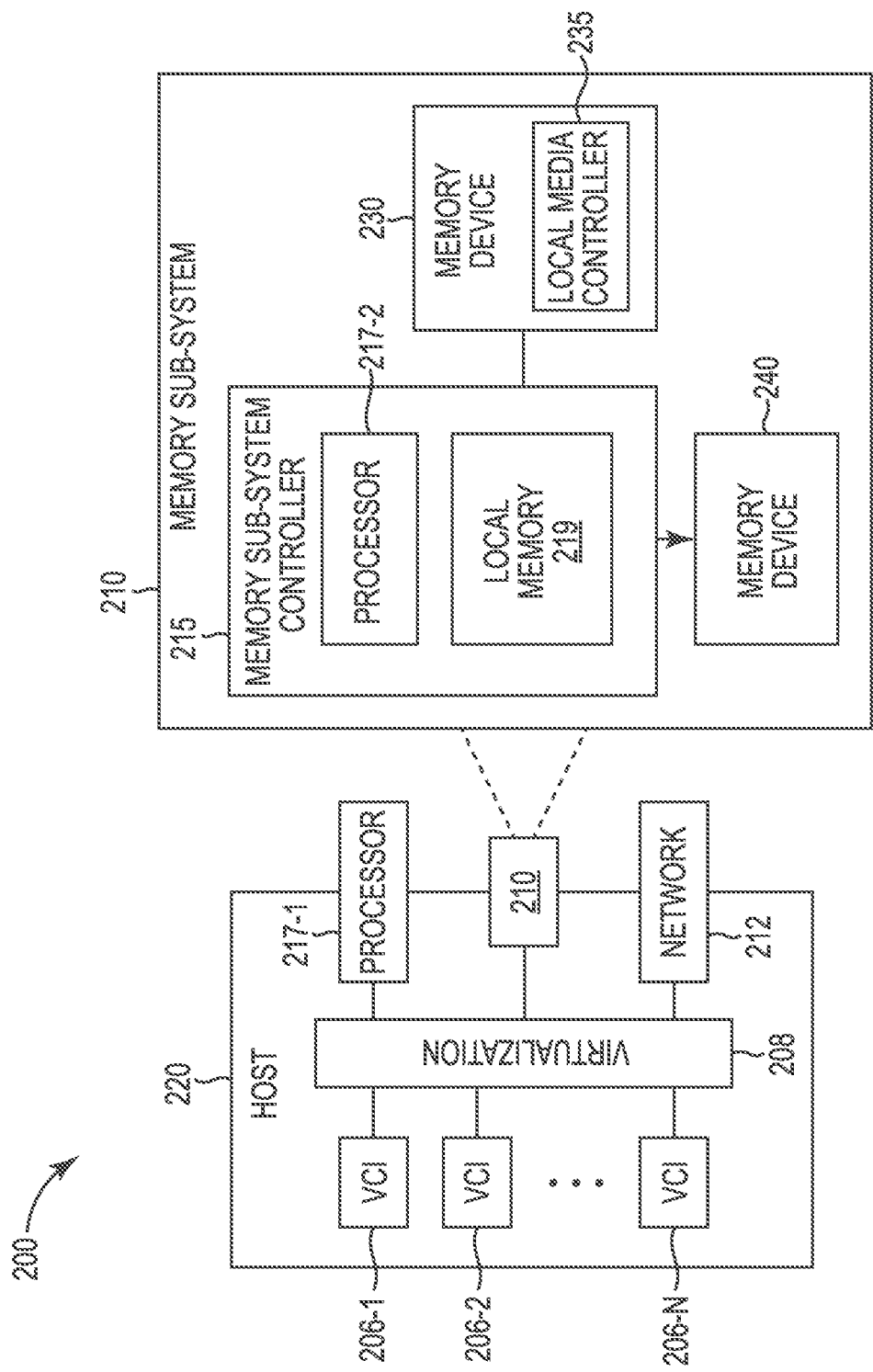
FIG. 2 is a block diagram of an example computing system that includes a memory sub-system in accordance with some embodiments of the present disclosure.

FIG. 2 is a block diagram of an example computing system 200 (e.g., computing system 100 in FIG. 1) that includes a memory sub-system 210 in accordance with some embodiments of the present disclosure. The memory sub-system 210 can include media, such as one or more volatile memory devices 240, one or more non-volatile memory devices 230, or a combination thereof.

The host system 220 can include or can be coupled to processing resources, memory resources, and network resources. As used herein, "resources" are physical or virtual components that have a finite availability within a computing system 200. For example, the processing resources can include a processing device 217-1 (or a number of processing devices), the memory resources can include memory sub-system 210 for secondary storage and main memory devices (not specifically illustrated) for primary storage, and the network resources can include a network interface 212. The processing device 217-1 can be one or more processor chipsets, which can execute a software stack. The processing device 217-1 can include one or more cores, one or more caches, a memory controller (e.g., NVDIMM controller), and a storage protocol controller (e.g., PCIe controller, SATA controller, etc.). The host system 220 can use the memory sub-system 210, for example, to write data to the memory sub-system 210 and read data from the memory sub-system 210.

The host system 220 can be configured to provide virtualized or non-virtualized access to the memory sub-system 210 and/or the processing resources and network resources. Virtualization can include abstraction, pooling, and automation of the processing, memory, and/or network resources. FIG. 2 generally illustrates the host system 220 providing virtualized access.

To provide such virtualization, the host system 220 can incorporate a virtualization layer 208 (e.g., hypervisor, virtual machine monitor, etc.) that can execute a number of virtual computing instances (VCIs) 206-1, 206-2, . . . , 206-N (individually or collectively referred to as VCIs 206). The virtualization layer 208 can provision the VCIs 206 with processing resources and memory resources and can facilitate communication for the VCIs 206 via the network interface 212. The virtualization layer 208 can represent an executed instance of software run by the host system 220. The term "virtual computing instance" covers a range of computing functionality. VCIs may include non-virtualized physical hosts, virtual machines (VMs), and/or containers. The VCIs 206 can therefore represent applications that run on the virtualization layer 208 or on an operating system executed by the host system 220. By way of example, the first VCI 206-1 can be an application that provides an instrument cluster for a vehicle, the second VCI 206-2 can be an application that provides a black box for the vehicle, and the third VCI 206-N can be an application that provides an infotainment system for the vehicle. Embodiments are not limited to these specific examples of applications.

The host system 220 can be coupled to the memory sub-system 210 via a physical host interface. In some embodiments, the memory device 230 can include a local media controller 235 as described in connection with local media controller 135 in FIG. 1. FIG. 2 illustrates a memory sub-system 210 as an example. In general, the host system 220 can access multiple memory sub-systems via a same communication connection, multiple separate communication connections, and/or a combination of communication connections.

The host system 220 can send requests to the memory sub-system 210, for example, to store data in the memory sub-system 210 or to read data from the memory sub-system 210. The data to be written or read, as specified by a host request, is referred to as "host data." A host request can include logical address information. The logical address information can be a logical block address (LBA), which may include or be accompanied by a partition number. The logical address information can be the location the host system 220 associates with the host data. The logical address information can be part of metadata for the host data. The LBA may also correspond (e.g., dynamically map) to a physical address, such as a physical block address (PBA), that indicates the physical location where the host data is stored in memory.

Figure 3:
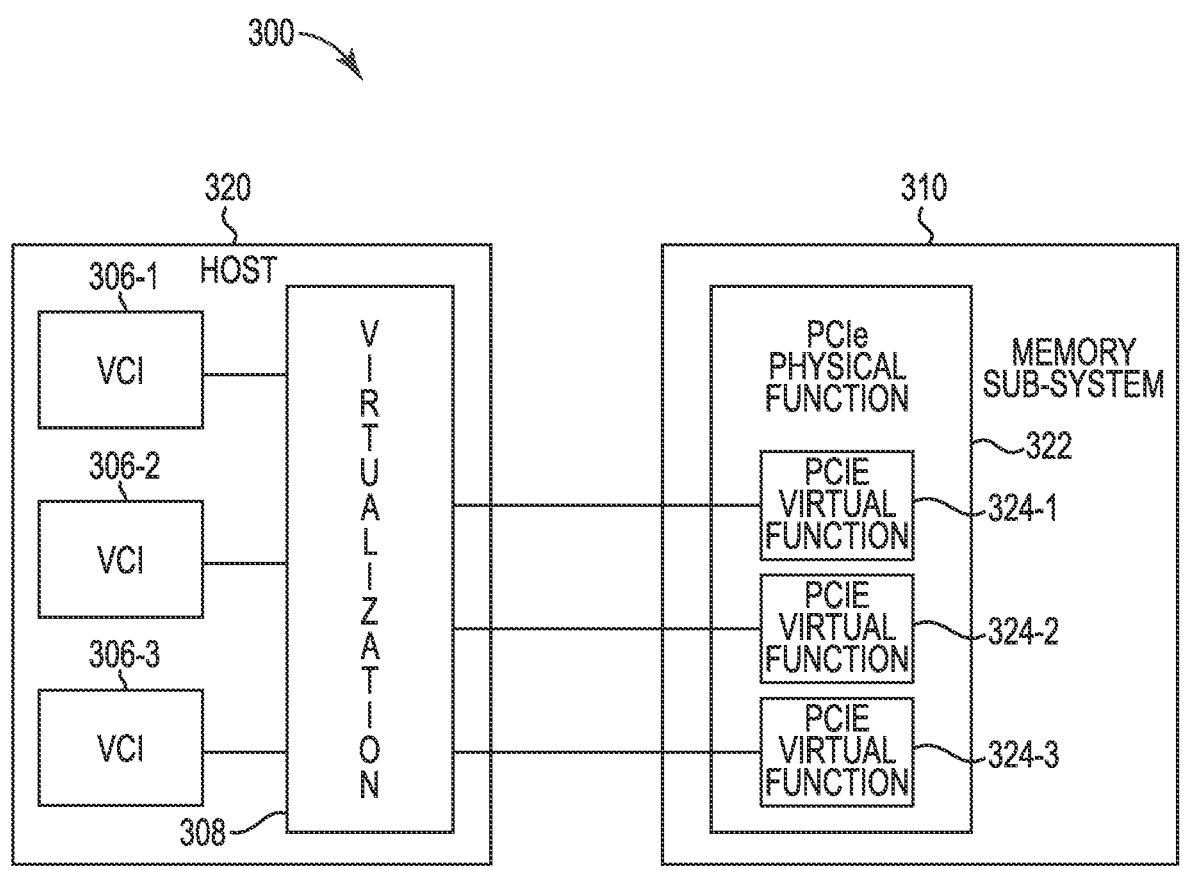
FIG. 3 is a block diagram of an example computing system that includes a memory sub-system in accordance with some embodiments of the present disclosure.

FIG. 3 is a block diagram of an example computing system 300 that includes a memory sub-system 310 in accordance with some embodiments of the present disclosure. FIG. 3 includes a host 320 that includes VCIs 306-1, 306-2, 306-3 (individually or collectively referred to as VCI 306) and a virtualization layer 308. FIG. 3 further includes a memory sub-system 310 coupled to the host 320, wherein the memory sub-system 310 includes at least one PCIe physical function 322 and a plurality of PCIe virtual functions 324-1, 324-2, 324-3 (individually or collectively know as virtual functions 324).

In some embodiments, the host 320 can use a host key to generate a digital signature. The digital signature can be generated using a mathematic cryptographic operation that uses a secret key (e.g., host key) stored on the host 320. In some embodiments, random numbers can be associated with the digital signature. In other embodiments, a monotonically increasing counter can be associated with the digital signature. As used herein, the term "monotonically increasing counter" refers to a counter that can increase in value or remain constant. A monotonically increasing counter does not decrease in value while the timer is active. In these embodiments, the digital signature can be valid (e.g., acceptable by the memory device for accessing a corresponding LBA range) for an amount of time associated with the monotonically increasing counter. Once that amount of time passes, a different digital signature can be generated to access the corresponding LBA range. In some embodiments, the digital signature can be a cryptographically verifiable item including, but not limited to, a hash-based message authentication code (HMAC), elliptic curve digital signature algorithm (ECDSA), and a Rivest-Shamir-Adleman (RSA) signature.

In some embodiments, a controller (e.g., controller 215 in FIG. 2) can be configured to define a plurality of address ranges in a memory device (e.g., memory device 230, 240 in FIG. 2), wherein each address range corresponds to a respective PCIe function 324, and assign a separate password and a separate host key to each of the address ranges to isolate access to each of the PCIe functions 324. The controller can be configured to allow write and/or read access to a particular address range in response to receiving the password and/or the digital signature created from the host key assigned to the address range. Further, the controller can be configured to deny write and/or read access to a particular address range in response to a request for the data not including the password and/or digital signature created from the host key assigned to the address range. Further, the controller can be configured to encrypt and store data in the memory device and isolate each of the plurality of virtual functions 324 from access by a plurality of virtual components.

In some embodiments, the controller can be configured to assign a respective host key to an LBA range based on a symmetric key or an asymmetric key. As used herein, the term "symmetric key" refers to an algorithm used to both encrypt and decrypt information. Further, as used herein, the term "asymmetric key" is an algorithm used to either encrypt data or decrypt data. The controller can be configured to provide access to a particular LBA range in response to receipt of the respective password and/or the respective digital signature created from the host key corresponding to the LBA range. The controller can be configured to provide access to a particular LBA range for subsequent access requests in response to the receipt of the respective password and/or the respective digital signature without requiring additional receipt of the respective password or the respective digital signature. Further, the controller can be configured to provide access to the particular LBA range for subsequent access requests only in response to receipt of either the respective password or the respective digital signature that was not previously received.

In some embodiments, the memory device can be an SSD memory device and each of the plurality of PCIe functions 324 can comprise at least one SSD namespace. As used herein, the term "namespace" refers to a set of signs (e.g., names) that are used to identify and refer to objects. In some embodiments, the respective passwords and host keys can isolate access to the PCIe functions 324 on an SSD namespace granularity. Further, in some embodiments, the address ranges can be LBA ranges and the respective passwords and host keys can isolate access to the PCIe functions 324 on a contiguous LBA range granularity.

Figure 4:
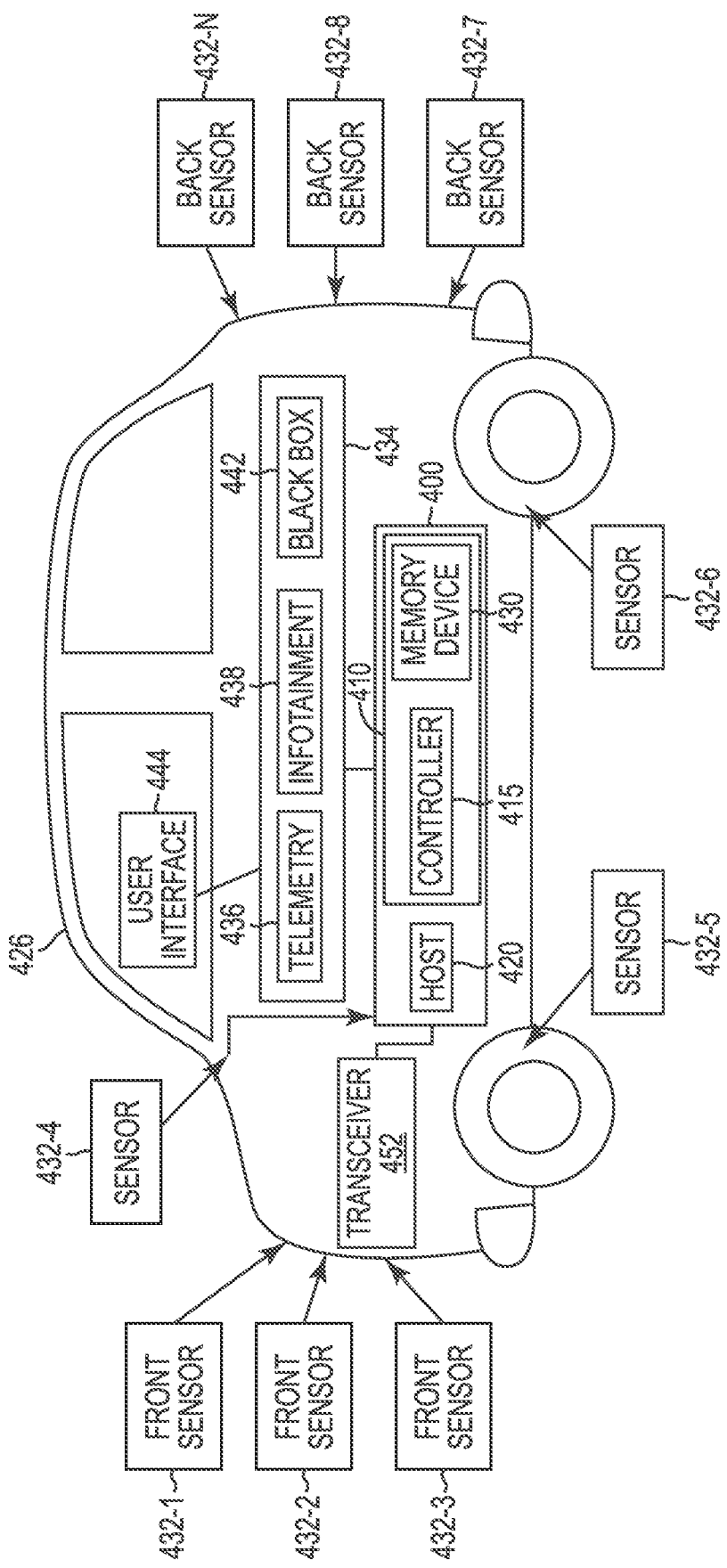
FIG. 4 is an example of a system including a computing system in a vehicle in accordance with some embodiments of the present disclosure.

FIG. 4 illustrates an example of a system including a computing system 400 in a vehicle 426 in accordance with some embodiments of the present disclosure. The computing system 400 can include a memory sub-system 410, which is illustrated as including a controller 415 and non-volatile memory device 430 for simplicity but is analogous to the memory sub-system 210 illustrated in FIG. 2.

The computing system 400, and thus the host 420, can be coupled to a number of sensors 432 either directly, as illustrated for the sensor 432-4 or via a transceiver 452 as illustrated for the sensors 432-1, 432-2, 432-3, 432-5, 432-6, 432-7, 432-8, . . . , 432-N. The transceiver 452 is able to receive data from the sensors 432 wirelessly, such as by radio frequency communication. In at least one embodiment, each of the sensors 432 can communicate with the computing system 400 wirelessly via the transceiver 452. In at least one embodiment, each of the sensors 432 is connected directly to the computing system 400 (e.g., via wires or optical cables).

The vehicle 426 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 432 are illustrated in FIG. 4 as including example attributes. For example, sensors 432-1, 432-2, and 432-3 are cameras collecting data from the front of the vehicle 426. Sensors 432-4, 432-5, and 432-6 are microphone sensors collecting data from the from the front, middle, and back of the vehicle 426. The sensors 432-7, 432-8, and 432-N are cameras collecting data from the back of the vehicle 426. As another example, the sensors 432-5, 432-6 are tire pressure sensors. As another example, the sensor 432-4 is a navigation sensor, such as a global positioning system (GPS) receiver. As another example, the sensor 432-6 is a speedometer. As another example, the sensor 432-4 represents a number of engine sensors such as a temperature sensor, a pressure sensor, a voltmeter, an ammeter, a tachometer, a fuel gauge, etc. As another example, the sensor 432-4 represents a camera. Video data can be received from any of the sensors 432 associated with the vehicle 426 comprising cameras. In at least one embodiment, the host 420 can compress the video data before providing the video data to the memory sub-system 410.

The host 420 can execute instructions to provide an overall control system and/or operating system for the vehicle 426. The host 420 can be a controller designed to assist in automation endeavors of the vehicle 426. For example, the host 420 can be an advanced driver assistance system controller (ADAS). An ADAS can monitor data to prevent accidents and provide warning of potentially unsafe situations. For example, the ADAS can monitor sensors in the vehicle 426 and take control of vehicle 426 operations to avoid accident or injury (e.g., to avoid accidents in the case of an incapacitated user of a vehicle). The host 420 may need to act and make decisions quickly to avoid accidents. The memory sub-system 410 can store reference data in the non-volatile memory device 430 such that data from the sensors 432 can be compared to the reference data by the host 420 in order to make quick decisions.

The host 420 can write data received from one or more sensors 432 and store the data (e.g., in association with a black box application 442 for the vehicle). The black box application 442 may also be referred to as an accident data recorder. With the advent of autonomous vehicles, some autonomous driving requires real time buffering of telemetric data such as video cameras, RADAR, LIDAR, ultrasonic and other sensors necessary to playback the sequences preceding an accident. Upon an event, a quantity (e.g., thirty seconds) of playback time immediately preceding an event needs to be captured to determine the cause of an incident. A playback may be referred to as a "snapshot." The application that controls storage of such information is referred to herein as a black box. A black box may need to store at least a few, most recent snapshots.

The host 420 can execute instructions to provide a set of applications 434 for the vehicle 426 including telemetry 436, infotainment 438, and a black box 442. The telemetry application 436 can provide information displayable on a user interface 444 that may be associated with the instrumentation and/or dashboard of a vehicle 426. An example of such telemetric information is the speed at which the vehicle 426 is traveling (e.g., based at least in part on data from a sensor 432). The infotainment application 438 can include information and/or entertainment for a user of the vehicle 426 displayable or interfaced via the user interface 444. Examples of such information and/or entertainment include music, movies, GPS information such as a moving map, etc. The memory sub-system 410 can provide storage for any of the set of applications 434. The set of applications 434 can be virtualized with backing storage provided by the memory sub-system 410.

Figure 5:
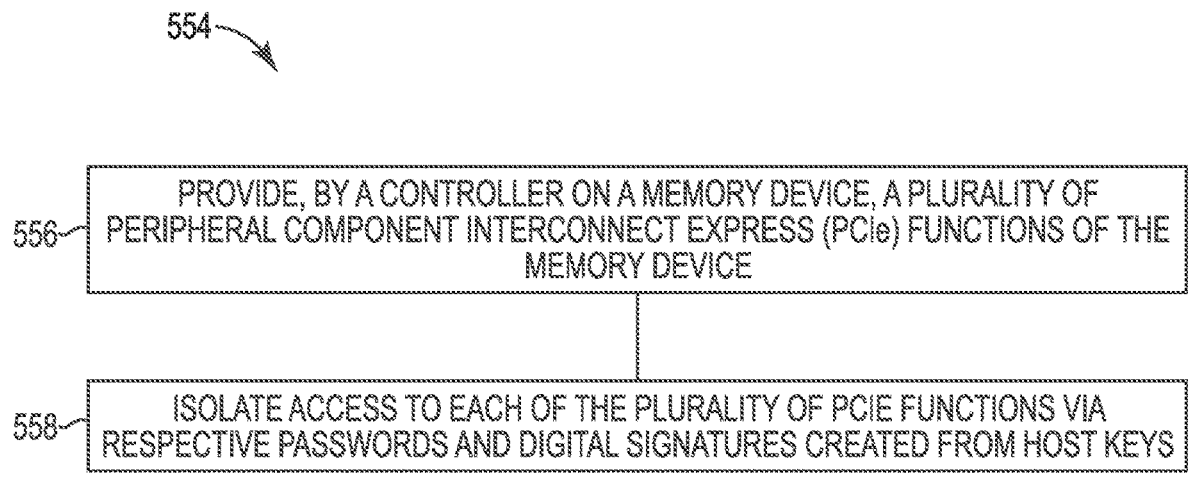
FIG. 5 is a flow diagram of an example method for isolating functions in a memory device in accordance with some embodiments of the present disclosure.

FIG. 5 is a flow diagram of an example method for isolating functions in a memory device in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 556, the method 554 can include providing, by a controller on a memory device, a plurality of PCIe functions of the memory device. As stated previously, a PCIe function can be a physical function or a virtual function. In some embodiments, each PCIe function can be initiated by a signal transferred from a host to the memory device associated with the PCIe function. The signal can be transferred via a PCIe interface that couples the host to the memory device.

At block 558, the method 554 can include isolating access to each of the plurality of PCIe functions via respective passwords and host keys. The same password can be used for each access to a PCIe function corresponding to a specific range of LBA addresses in the memory device and a different password can be used for access to different ranges of LBAs. Further, a different digital signature created from the host key can be used for each access to a PCIe function corresponding to a specific range of LBAs.

In some embodiments, a digital signature can be invalidated after the digital signature is used to access a range of LBAs. Invalidating a digital signature refers to a memory sub-system refusing access to a range of LBAs in response to receiving the digital signature that was used in a previous access request corresponding to the range of LBAs. In some embodiments, the digital signature is invalidated regardless of whether the previous access request that included the digital signature was accepted or denied.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory apparatus, comprising:
a memory device; and
a controller coupled to the memory device, wherein the controller is configured to:
provide a plurality of peripheral component interconnect express (PCIe) functions of the memory device; and
isolate access to each of the plurality of PCIe functions via respective passwords and digital signatures created from host keys.

2. The memory apparatus of claim 1, wherein the controller is configured to:
define a plurality of address ranges in the memory device, wherein each address range corresponds to a respective PCIe function; and
assign a separate password and a separate host key to each of the address ranges to isolate access to each of the PCIe functions.

3. The memory apparatus of claim 2, wherein the controller is configured to allow write or read access to a particular address range in response to receiving the password assigned to the address range and the digital signature created from the host key assigned to the address range.

4. The memory apparatus of claim 2, wherein the controller is configured to deny write or read access to a particular address range in response to a request for the data not including the password and the digital signature created from the host key assigned to the address range.

5. The memory apparatus of claim 1, wherein the memory device is a solid-state drive (SSD) memory device; and
wherein each of the plurality of PCIe functions comprises at least one SSD namespace.

6. The memory apparatus of claim 5, wherein the respective passwords and host keys isolate access to the PCIe functions on an SSD namespace granularity.

7. The memory apparatus of claim 5, wherein the address ranges are logical block address (LBA) ranges; and wherein the respective passwords and host keys isolate access to the PCIe functions on a contiguous LBA range granularity.

8. The memory apparatus of claim 1, wherein the controller is configured to encrypt and store data in the memory device;
wherein the plurality of PCIe functions comprise a plurality of virtual functions; and
wherein the controller is configured to isolate each of the plurality of virtual functions from access by a plurality of virtual components.

9. The memory apparatus of claim 8, wherein the plurality of PCIe functions further comprises at least one physical function.

10. A memory apparatus, comprising:
a memory device; and
a controller coupled to the memory device, wherein the controller is configured to:
define a plurality of logical block address (LBA) ranges in the memory device, each range corresponding to a respective peripheral component express (PCIe) function of the memory device;
assign a respective password and a respective host key to each LBA range in the memory device, wherein a respective digital signature is created from the respective host key; and
isolate access to each LBA range via the respective password and host key.

11. The memory apparatus of claim 10, wherein the controller is configured to assign the respective host key based on a symmetric key.

12. The memory apparatus of claim 10, wherein the controller is configured to assign the respective host key based on an asymmetric key.

13. The memory apparatus of claim 10, wherein the controller is configured to provide access to a particular LBA range in response to receipt of the respective password or the respective digital signature corresponding to the LBA range.

14. The memory apparatus of claim 13, wherein the controller is configured to provide access to the particular LBA for subsequent access requests in response to the receipt of the respective password or the respective digital signature without requiring additional receipt of the respective password or the respective digital signature.

15. The memory apparatus of claim 13, wherein the controller is configured to provide access to the particular LBA for subsequent access requests only in response to receipt of one of the respective password or the respective digital signature that was not previously received.

16. A method, comprising:
providing, by a controller on a memory device, a plurality of peripheral component express (PCIe) functions of the memory device; and
isolating access to each of the plurality of PCIe functions via respective passwords and digital signatures created from host keys.

17. The method of claim 16, further comprising using a same password for each access to a PCIe function corresponding to a specific range of logical block addresses (LBA) in the memory device.

18. The method of claim 16, further comprising using a different password for access to different ranges of LBA.

19. The method of claim 16, further comprising using a different digital signature for each access to a PCIe function corresponding to a specific range of LBA.

20. The method of claim 16, further comprising invalidating a digital signature after the digital signature is used to access a range of LBA.

\* \* \* \* \*